May 18, 1937. J. B. VAN HORN ET AL 2,080,678
MOTOR CONSTRUCTION
Filed Feb. 15, 1936
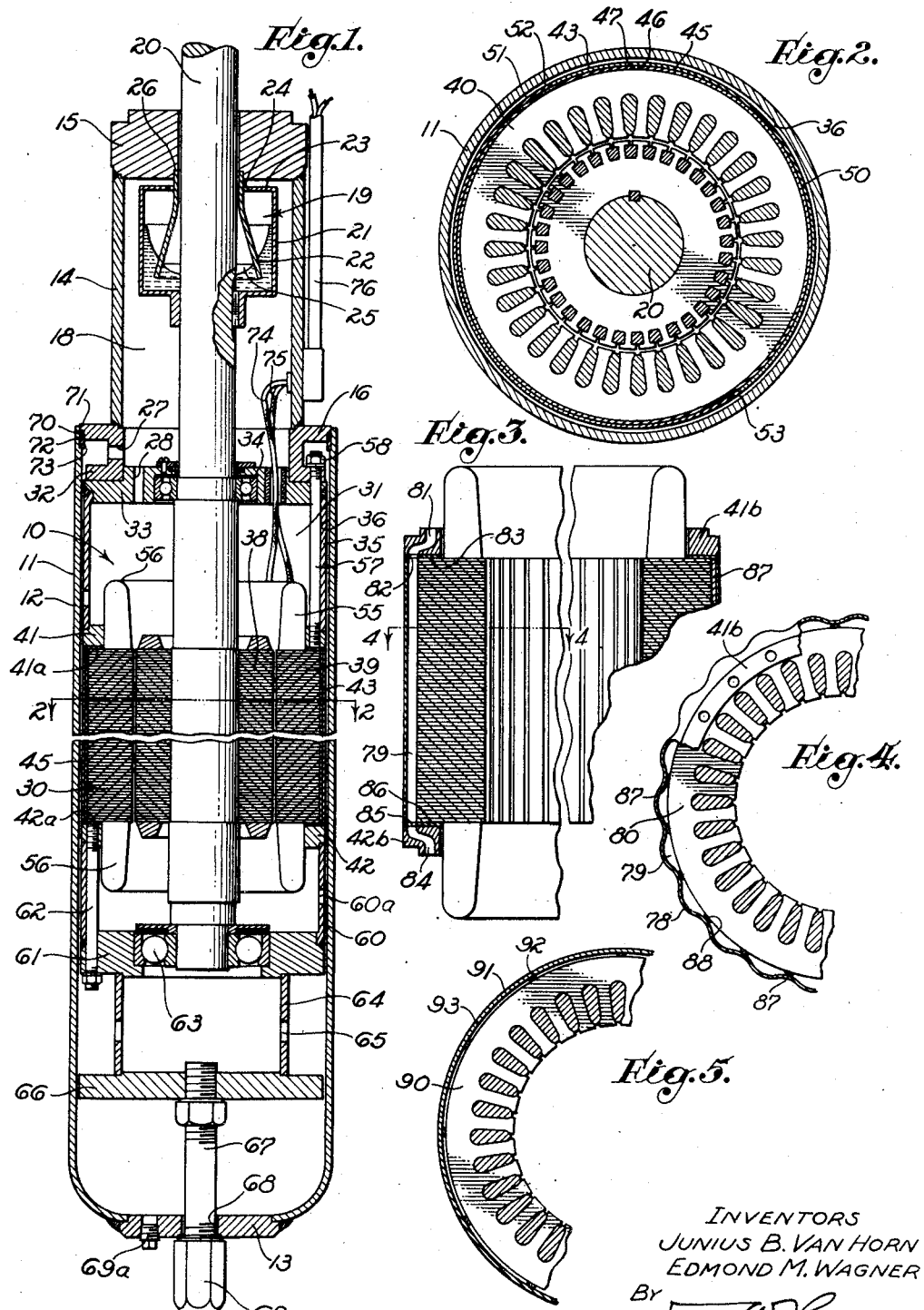
INVENTORS
JUNIUS B. VAN HORN
EDMOND M. WAGNER
BY
ATTORNEY.

Patented May 18, 1937

2,080,678

UNITED STATES PATENT OFFICE 2,080,678

MOTOR CONSTRUCTION

Junius B. Van Horn, Alhambra, and Edmond M. Wagner, South Gate, Calif., assignors, by mesne assignments, to Byron Jackson Co., Huntington Park, Calif., a corporation of Delaware Application February 15, 1936, Serial No. 64,060

4 Claims. (Cl. 171—252)

Our invention relates to a dynamo-electric machine, and more particularly to a dynamo-electric machine construction in which increased efficiency is attained by reducing eddy current and other losses therein and maintaining a relatively cool stator by a cooling system.

Although our invention has many applications in the dynamo-electric machine art, it is of particular utility in a submersible motor pump unit adapted to be submersed in a liquid to be pumped, and we will therefore describe our invention in connection with such a unit, although we do not intend to be limited to such a use of the invention.

In its preferred embodiment, the invention is utilized in an electric motor used in conjunction with a deep well turbine pump. When used in this capacity, the motor and pump are connected together as an integral unit and lowered into a well from which liquid is to be pumped. Due to the small diameter of the average well in which our invention finds its primary use, it is important that the motor have a small diameter, and that the construction thereof be as compact as possible to permit its use in such a well. In our invention compactness is attained as described hereinafter.

In the motor construction commonly used in the art for submersible motor pump units, the stator is housed in a sealed shell so that the periphery of the stator laminations directly contacts the shell. Such stator shells are ordinarily made of steel or other magnetic metal in two semi-cylindrical pieces which are welded together so as to enclose the stator of the motor. In the welding of such a sectional stator shell, a portion at least of the weld may form a bond with the stator laminations. During electrical operation of the motor, eddy currents are set up in the shell by a leakage of magnetic flux from the pole fields into the shell, which materially reduce the efficiency of the motor, and hysteresis losses are high. Such a motor construction is clearly shown in the patent to Mendenhall, et al., No. 2,002,915, issued May 28, 1935. We have also found that in the ordinary motor construction such as just described, where the stator shell is welded directly to the stator laminations, a hot spot may be created in the motor at the point of the weld, which under operating conditions may damage the stator windings, which is an undesirable feature.

It is therefore a primary object of our invention to increase the efficiency of an electric motor by reducing eddy current and other losses in the stator shell during normal operation of the device. This may be accomplished in a variety of ways, but we prefer to do it by providing a non-magnetic spacing means between the external periphery of the stator laminations and the stator shell, and the provision thereof is an object of the invention. This non-magnetic spacing means may be a sheath of non-magnetic material, or a gap may be formed between the stator laminations and the shell, both constructions materially reducing eddy currents and hysteresis in the shell and increasing the efficiency of the motor in some cases at least 5% by limiting the leakage of magnetic field into the shell.

It is a further object of our invention to provide a dynamo-electric machine having a stator enclosed in a stator shell, in which the stator shell is spaced from the external periphery of the stator laminations so as to form a cooling space therebetween. In this construction, excess heat in the stator laminations may be readily conveyed away from the stator to keep the stator relatively cool and to increase the efficiency of the motor.

A still further object of our invention is to provide a dynamo-electric machine having a stator shell and a stator therein with non-magnetic means therebetween such that when the machine is operated, the reluctance across the gap between the stator and the shell will be high relative to the reluctance along a line of force in the stator laminations.

Another object of our invention is to provide spacing means between the stator and the stator shell of a dynamo-electric machine which has a high electrical resistance so as to reduce eddy current and other losses caused by lines of force in the spacing means during operation of the machine.

We have found that where a sectional stator shell is used in motor construction and the sections welded together during assembly, the weld will often burn through the non-magnetic spacer positioned between the shell and the stator laminations so as to weld the shell directly to the laminations. The weld, in such cases, provides a magnetic path between the stator shell and the stator which permits a leakage of magnetic flux directly into the stator shell to cause objectionable eddy currents and hysteresis in the shell. To obviate this difficulty, we prefer to use a welding material which will produce a non-magnetic weld, for example, stainless steel, which, accordingly, is a further object of our invention. It is preferable, although not essential that the welding material be the same as the material of which the non-magnetic spacer is formed, so that any mixture of welding and spacer material formed during the welding will not form a magnetic path through the weld into the stator shell or be detrimental to the strength of the weld. By "welding" we intend to include any method of joining two metal surfaces together by means of heat, such as, for example, welding or brazing.

It is a further object of our invention to provide a dynamo-electric machine having a welded stator shell spaced from the stator thereof in which the welding material is non-magnetic, so that if the welding material forms a bond between the shell and the stator, the transmission of magnetic flux to the shell through the weld will be maintained at a minimum.

Our invention also includes a dynamo-electric machine having a stator and a stator shell separated by a relatively thin non-magnetic spacer means interposed between the stator and the shell so as to decrease eddy current and other losses in the shell, and, accordingly, this is another object of the invention. The non-magnetic spacer may be a separate element, or it may be formed integrally with either the stator shell or the stator laminations, for example, by spraying a thin coating of stainless steel on the internal surface of the shell or on the external periphery of the stator laminations. Where the integral construction is utilized, the stator shell may be assembled in contact with the stator laminations.

Instead of providing a circulatory cooling system as described above, it is preferable in some cases to conduct the heat generated by the dynamo-electric machine directly through the spacer element and the stator shell to the exterior thereof, and, accordingly, it is a further object of our invention to provide such a machine having a spacer element formed of material having a high heat conductivity, such as, for example, stainless steel.

Another object of our invention is to supply a dynamo-electric machine having a stator shell separated from the stator thereof by means of a spacer element formed of non-magnetic material having a high heat conductivity.

Other objects and advantages of our invention will be apparent from the following description and the drawing, in which:

Fig. 1 is a longitudinal sectional view of a preferred form of the invention in a housing adapted to be connected to a deep well turbine pump.

Fig. 2 is a cross-sectional view taken on the line 2—2 of Fig. 1.

Fig. 3 is a fragmentary view, partially in section, of an alternative form of the invention.

Fig. 4 is a cross-sectional view taken on the line 4—4 of Fig. 3.

Fig. 5 is a cross-sectional view of another alternative form of the invention, in which a plurality of spacers are utilized to provide an air gap between the stator and the stator shell.

Referring to Fig. 1, we show a motor unit 10 adapted to actuate a pumping unit (not shown) when submerged in a fluid to be pumped from a well. The motor unit 10 includes a motor casing means 11, which may be of any suitable form, but we prefer to utilize a sectional casing including a cylindrical casing 12, a bottom wall 13 closing the lower end of the cylindrical casing, an auxiliary shell 14, a top wall 15, and a head member or wall 16 joining the cylindrical casing 12 and the auxiliary shell 14. With this construction the auxiliary shell 14 is preferably of smaller diameter than the cylindrical casing 12 and is welded or otherwise secured at opposite ends to the top wall 15 and the head member 16. It will be understood, however, that the motor casing 11 may be made unitary rather than in sections, as described, without departing from the spirit of the invention.

The top wall 15 and the auxiliary shell 14 define a seal chamber 18 containing a seal 19 adapted to seal a motor shaft 20 where it passes through the top wall 15 of the motor casing 11. This seal may be of any type which will effectively seal this junction so as to prevent admixture of fluid in the motor casing 11 with fluid external thereto and surrounding the motor shaft 20 where it passes through the top wall 15. It is usually desirable to completely fill the upper end of the motor casing 11 with a neutral liquid, such as oil having relatively good dielectric properties which may lubricate the working parts of the motor unit and provide an efficient cooling means therefor, and if the motor unit 10 is used in pumping a water well, it is essential that the water which may surround the shaft 20 external to the motor unit does not enter the interior of the motor shell so as to come in contact with the electrical apparatus therein. A fluid packed seal has been found to serve this purpose most effectively, and one type of such seal is disclosed in Fig. 1.

In the form shown, the seal 19 provides a cup 21 secured in fluid-tight relationship with the shaft 20 so as to rotate therewith. This cup 21 retains a body of sealing liquid such as mercury. A baffle 22 extends into the cup 21 and below the surface of the sealing liquid, and a cap 23 extends across the upper end of the cup 21 and the baffle, terminating short of the baffle to provide an annular space 24 through which neutral liquid may enter that portion of the cup 21 which lies outside the baffle 22, this neutral liquid contacting the surface of the sealing liquid in the outer portion of the cup. The baffle 22 is of larger diameter than the shaft 20 to provide a conical space 25 therebetween. The upper end of the baffle 22 is secured in fluid-tight relationship with the top wall 15 and extends into an annular groove 26 therein.

A motor 30, preferably of the squirrel-cage induction type, is positioned in a motor chamber 31 by a structure now to be described. As shown in Fig. 1, the head member 16 includes a flange 32 contacted by a bearing plate 33 carrying a bearing 34, preferably of the ball or roller type, which journals the shaft 20. Depending from the bearing plate 33 is an upper baffle 35 of smaller diameter than the cylindrical casing 12 so as to provide a cooling space 36 therebetween. The head member 16 has circulation openings 27 therethrough communicating with the space 36 and the seal chamber 18, and the bearing plate 33 has circulation openings 28 therethrough communicating between the seal chamber and the motor chamber 31, for a purpose to be described hereinafter. The motor 30 includes a rotor 38 and a stator 39, the stator including a plurality of laminations 40 clamped together between upper and lower rings 41 and 42, respectively, the laminations being separated from the rings by means of non-magnetic gaskets 41a and 42a, the rings being in turn secured to a stator shell or casing 43 which surrounds the laminations but which has an internal diameter slightly greater than the external diameter of the laminations, and which has an external diameter slightly less than the internal diameter of the cylindrical casing 12.

In the embodiment shown in Fig. 1, we prefer to include spacer means between the stator shell 43 and the stator laminations 40, formed of non-magnetic material so as to materially reduce any eddy currents which might otherwise be set up in the stator shell during normal operation of the motor. As best shown in Fig. 2, this spacer means is provided in the form of a one-piece spacer element or sheath 45 which fits closely over the stator laminations 40 and over which the stator shell 43 is positioned so as to hold the stator shell concentric with the stator laminations. In assembly the spacer element 45 is bent around the laminations 40 so that the ends 46 and 47 thereof are spaced slightly apart when the spacer is in position enclosing the stator laminations, and no attempt is made to secure the ends together. The spacer element 45 is formed of non-magnetic material, such as, for example, stainless steel, mica, copper, brass, or other non-magnetic material, and is of relatively thin construction. The non-magnetic gaskets 41a and 42a are preferably formed of the same non-magnetic material as the spacer element 45, and serve to prevent eddy currents from being set up in the upper and lower end rings 41 and 42. The thickness of the spacer element 45 depends in any particular installation upon the density at which the iron in the motor is being worked, and should be great relative to the equivalent air gap of the path of the magnetic lines of force in the stator core, and is usually on the order of three to five times that of the equivalent air gap of the stator core. In the preferred construction shown in Fig. 1 and with the motors that we use commercially, best results are attained by utilizing a spacer element having a thickness of between 0.015 and 0.020 of an inch. It is to be understood, however, that this specific thickness of the spacer element is merely illustrative, and that lesser working densities may permit the use of a somewhat thinner spacer element. The use of a thin spacer element as described provides a very compact motor unit, which is required where the motor unit is to be submersed in a small-diameter well, and this is an important feature of the invention. It is also to be noted that where we use the term "magnetic insulator" or the like, we intend a means which materially reduces the flow of magnetic flux from the stator of the motor to the surrounding structure.

As best illustrated in Fig. 2, the stator shell 43 is preferably formed in two semi-cylindrical sections 50 and 51 welded together as at 52 and 53 so as to rigidly enclose the spacer element 45. This construction of the stator shell 43 is provided merely for convenience in assembling the motor unit and for rigidity of construction, and it is to be understood that the stator shell 43 may be made in one section or a plurality of sections without departing from the spirit of the invention. In the forms shown, the stator shell 43 is made of relatively heavy construction as compared with the spacer element 45. By using the spacing element 45 formed of non-magnetic material as described, eddy current and other losses in the stator shell are substantially reduced, and we have found that by the use of such a spacer means the reluctance across the space between the stator laminations 40 and the stator shell 43 is high relative to the reluctance along a line of force in the stator laminations, and that the efficiency of the motor 30 is increased in some cases at least 5% by our construction, which materially reduces the cost of operation of the motor unit. Eddy currents in the spacer 45 are prevented by making the spacer of a material having a high electrical resistance. Use of a non-inflammable spacer element is also desirable so that in the event of the motor burning out during operation the spacer element will not be destroyed.

It is also important in some installations to provide means for readily cooling the motor unit by transferring a large part of the heat generated therein directly through the stator shell. Since the spacer element 45 naturally tends to impede this heat transfer, it is an important feature of our invention to provide a spacer element as described but formed of material having a high heat conductivity so that a large part of the heat generated in the stator may be readily conducted through the spacer and to the stator shell. We have found that stainless steel is a good material for this purpose. For most efficient cooling, we prefer to assemble the device with a close contact between the spacer element 45 and both the laminations 40 and the stator shell 43. By using a spacer element formed of material having a high electrical resistance we materially limit eddy currents flowing between stator laminations.

The stator 39 of the motor 30 is provided with a winding 55 which includes exposed portions 56 extending from the laminations of the stator in the usual manner. The lower end of the baffle 35 extends downwardly in the space between the exposed portions 56 and the cylindrical casing 12 and contacts the ring 41. A plurality of studs 57 are threaded into the ring 41 and extend upwardly inside the baffle 35 and through the bearing plate 33 and the flange 32, a nut 58 serving to clamp these members as a unit so that the stator 39 is suspended from the head member 16.

At the lower end of the stator 39 is positioned a similar baffle 60 having an opening 60a therethrough, which extends into the space between the lower exposed portions 56 of the stator winding 55 and the cylindrical casing 12 to contact the ring 42. A lower bearing plate 61 is secured to the lower end of the baffle 60, and this bearing plate and the baffle are clamped to the lower ring 42 by a plurality of studs 62 similar to the studs 57. The bearing plate 61 carries a thrust bearing 63, which is preferably of the roller or ball type, receiving the end of the shaft 20.

Welded or otherwise secured to the lower bearing plate 61 is a perforated member 64 providing openings 65 therethrough and carrying a lower wall 66 thereon. The wall 66 is of slightly smaller diameter than the cylindrical casing 12 so that free communication is provided between the spaces above and below the wall. The upper end of a stud 67 is threadedly received in the wall 66 and extends downwardly through an opening 68 in the bottom wall 13. The lower end of the stud 67 is also threaded to receive a nut 69 which engages the exterior of the bottom wall 13 in fluid-tight relation. The bottom wall 13 is provided with a drain plug 69a threadedly received therein and which may be removed to drain the shell 11.

From the foregoing description, it will be clear that the operating parts of the motor 30 are suspended from the head member 16 and do not rely on the cylindrical casing 12 to retain them in correct relation. Thus, a motor frame is formed which is supported independently of the cylindrical casing 12 and which is comprised of the members 33, 34, 35, 41, 43, 42, 60, 61, 63, 64, and 66. After the motor frame is secured in place to the head member 16, the cylindrical casing 12 can be slid upwardly around the motor until it engages the head member 16. A fluid-tight joint is formed between the cylindrical casing 12 and the head member 16 by a packing ring 70 held between an annular lip 71 formed on the head member and a ring 72 seating in a counterbore 73 formed in the casing. As the casing 12 is moved upwardly relative to the head member 16, the packing ring 70 is compressed, such upward movement of the shell being accomplished by turning the nut 69 by means of a wrench applied thereto.

Electric current is supplied to the motor 30 by means of conductors 74 enclosed in a waterproof tubing 76 leading to a source of electricity. The motor unit 10 is designed so that it may be attached to a deep well turbine pump unit of standard design (not shown) so that the shaft 20 actuates the pumping mechanism thereof.

During operation of the motor unit 10, as shown in Figs. 1 and 2, a circulation of neutral fluid, such as lubricating oil, is set up therein which assists in cooling the motor 30. This cooling circulation is set up by convection currents in the fluid and by rotation of the shaft 20 and bearings 34 and 63, the fluid circulating through the bearings, the circulation openings 27, 28, 60a, and 65, and through the cooling space 36, to dissipate the heat generated by the motor.

Figs. 3 and 4 show an alternative form of spacer means, in which an air gap is utilized between the stator laminations and the stator shell. In this form of our invention, a fluted stator shell 78 is utilized so as to provide a plurality of longitudinal spaces or channels 79 around the periphery of the stator laminations 80, and which communicate through openings 81 in the end ring 41b and openings 82 in the top gasket 83 with the upper end of the motor chamber. The channels 79 likewise communicate through openings 84 in the end ring 42b and openings 85 in the bottom gasket 86 with the lower end of the motor chamber. The shell 78 is preferably spaced from the stator laminations 80 by means of a plurality of beads 87 formed of non-magnetic material on the stator laminations and which contact the inner surfaces 88 of the fluted shell, and to which the stator shell may be welded or otherwise secured. The channels or spaces 79 act as non-magnetic spacer means between the laminations 80 and the stator shell 78, and also provide channels through which neutral fluid in the motor chamber may be circulated to cool the exterior of the stator. We have found that in some installations where space requirements permit, this type of construction will provide adequate cooling for the motor and will keep eddy current and other losses in the shell at a minimum. It is to be understood that the stator construction shown in Figs. 3 and 4 is intended to be substituted for the stator construction shown in Figs. 1 and 2 as one embodiment of the invention.

Another alternative form of stator construction is illustrated in Fig. 5, in which stator laminations 90 are spaced from the stator shell 91 by means of non-magnetic spacer elements 92 positioned substantially equidistant around the periphery of the laminations to provide annular spaces 93 between the stator shell and the laminations. The spacer elements 92 are preferably formed of strips of non-magnetic material which is similar to the material used for the spacer element 45 of Fig. 1, and of sufficient length to extend the full length of the stator, although any convenient form of spacer element may be substituted for this construction. The spaces 93 act as a non-magnetic spacer means to reduce eddy currents which would otherwise be set up in the stator shell 91 during operation of the motor unit. In this form of our device, the stator shell 91 is made in one piece, and the laminations 90 are stacked therein. It is intended that the construction shown in Fig. 5 may be substituted for the stator shell 78 and beads 87 shown in Figs. 3 and 4, so that the spaces 93 may communicate through the openings 81, 82, 84, and 85 in the end rings 41b and 42b to provide a circulatory cooling system for cooling the motor, similar to that described in connection with Figs. 3 and 4.

Although we have shown the preferred embodiment of our invention as used in connection with a submersible motor-pump unit, together with alternative forms of spacing means therefor, it will be understood that the invention has other applications in the dynamo-electric machine art, and we do not intend to be limited to the embodiments shown but should be accorded the full scope of the following claims.

We claim as our invention:

1. In a dynamo-electric machine, the combination of: a stator having a magnetic body and providing a rotor opening; a rotor in said rotor opening; a shaft fixed to said rotor; bearing means adapted to rotatably support said shaft; a non-magnetic sheath element substantially enclosing said magnetic body, said element being formed of material having a high heat conductivity; and a shell enclosing said sheath element and secured relative thereto.

2. In a dynamo-electric machine, the combination of: a stator having a magnetic body and providing a rotor opening; a rotor in said rotor opening; a shaft fixed to said rotor; bearing means adapted to rotatably support said shaft; a non-magnetic sheath element substantially enclosing said magnetic body, said element being formed of material having a high heat conductivity and having a high electrical resistance; and a shell enclosing said sheath element and secured relative thereto.

3. In a dynamo-electric machine, the combination of: a stator having a magnetic body and providing a rotor opening; a rotor in said rotor opening; a shaft fixed to said rotor; bearing means adapted to rotatably support said shaft; a non-magnetic sheath element substantially enclosing said magnetic body, said element being formed of material having a high heat conductivity, and said sheath element being in close contact with the external periphery of said stator; and a shell enclosing said sheath element and secured relative thereto, said shell being in close contact with said sheath.

4. In a dynamo-electric machine, the combination of: a stator having a magnetic body and providing a rotor opening; a rotor in said rotor opening; a shaft fixed to said rotor; bearing means adapted to rotatably support said shaft; and a non-magnetic metal sheath element substantially enclosing said stator so as to magnetically insulate said magnetic body.

JUNIUS B. VAN HORN.
EDMOND M. WAGNER.